US009857033B2

(12) United States Patent
Stich

(10) Patent No.: US 9,857,033 B2
(45) Date of Patent: Jan. 2, 2018

(54) LIGHTING APPARATUS

(71) Applicant: OSRAM OPTO SEMICONDUCTORS GMBH, Regensburg (DE)

(72) Inventor: Andreas Stich, Regensburg (DE)

(73) Assignee: OSRAM GmbH, Munich (DE)

( * ) Notice: Subject to any disclaimer, the term of this patent is extended or adjusted under 35 U.S.C. 154(b) by 70 days.

(21) Appl. No.: 14/426,703

(22) PCT Filed: Sep. 2, 2013

(86) PCT No.: PCT/EP2013/068080
§ 371 (c)(1),
(2) Date: Mar. 6, 2015

(87) PCT Pub. No.: WO2014/037301
PCT Pub. Date: Mar. 13, 2014

(65) Prior Publication Data
US 2015/0252959 A1    Sep. 10, 2015

(30) Foreign Application Priority Data

Sep. 6, 2012   (DE) .................. 10 2012 108 294

(51) Int. Cl.
*F21V 1/00*        (2006.01)
*F21K 99/00*       (2016.01)
(Continued)

(52) U.S. Cl.
CPC .................. *F21K 9/30* (2013.01); *F21K 9/20* (2016.08); *F21K 9/60* (2016.08); *F21K 9/61* (2016.08);
(Continued)

(58) Field of Classification Search
CPC ..... F21K 9/30; G02B 6/0078; G02B 1/13336; G02B 6/0011; G02B 6/0028; G02B 6/0075; G02B 6/008; G02B 6/0046
(Continued)

(56) References Cited

U.S. PATENT DOCUMENTS

| 5,704,703 A | 1/1998 | Yamada et al. |
| 8,755,007 B2 * | 6/2014 | Momose ............. G02B 6/0046 349/64 |

(Continued)

FOREIGN PATENT DOCUMENTS

| CN | 1751253 | 3/2006 |
| CN | 101793366 | 8/2010 |

(Continued)

OTHER PUBLICATIONS

Search Report dated Jun. 28, 2017 in the corresponding Chinese Patent Application No. 201380057989.3.

*Primary Examiner* — Anh Mai
*Assistant Examiner* — Matthew Peerce
(74) *Attorney, Agent, or Firm* — Cozen O'Connor

(57) ABSTRACT

The invention relates to a lighting apparatus, having a quadrangular lighting surface, wherein the quadrangular lighting surface has a first lateral edge a and an opposing lateral edge $a_g$, wherein the quadrangular lighting surface has a second lateral edge b and an opposing lateral edge $b_g$, wherein the quadrangular lighting surface is constructed modularly from at least a first lighting module and further lighting modules. The at least first lighting module is triangular, wherein the base surface of the first lighting module has a lateral edge b1 and a vertex E1 opposing this lateral edge b1, wherein a connecting path between the vertex E1

(Continued)

and an intersection point L1 of a normal line with the lateral edge b1 is a height h1 of the first lighting module, where $0 < h1 \leq a$ and $b = b1$.

15 Claims, 11 Drawing Sheets

(51) Int. Cl.
  *F21V 8/00* (2006.01)
  *F21K 9/20* (2016.01)
  *F21K 9/60* (2016.01)
  *F21K 9/61* (2016.01)
  *F21Y 115/10* (2016.01)

(52) U.S. Cl.
  CPC ......... *G02B 6/0005* (2013.01); *G02B 6/0078* (2013.01); *F21Y 2115/10* (2016.08); *G02B 6/008* (2013.01)

(58) Field of Classification Search
  USPC .............................................. 362/235; 62/235
  See application file for complete search history.

(56) References Cited

U.S. PATENT DOCUMENTS

| | | |
|---|---|---|
| 2006/0245213 A1 | 11/2006 | Beil et al. |
| 2010/0124077 A1 | 5/2010 | Higuchi et al. |
| 2010/0207933 A1 | 8/2010 | Suzuki et al. |

FOREIGN PATENT DOCUMENTS

| | | | |
|---|---|---|---|
| DE | 43 31 793 | | 3/1995 |
| DE | 103 14 525 | | 11/2004 |
| DE | 10 2008 014 172 | | 10/2009 |
| EP | 1 847 859 | | 10/2007 |
| JP | 2003331627 A | * | 11/2003 |
| WO | WO 2010/150130 | | 12/2010 |

\* cited by examiner

LIGHTING APPARATUS

RELATED APPLICATIONS

This is a U.S. National Phase Application under 35 USC 371 of International Application PCT/EP2013/068080 filed on Sep. 2, 2013.

This application claims the priority of German application no. 10 2012 108 294.4 filed Sep. 6, 2012, the entire content of which is hereby incorporated by reference.

FIELD OF THE INVENTION

The present invention relates to a lighting apparatus.

BACKGROUND OF THE INVENTION

Displays which are used for example for monitors have to be through-illuminated or back-illuminated when using liquid crystal displays (LCDs) which themselves do not illuminate. For this purpose, typically cold cathode lamps or, in terms of miniaturisation and production of flat screens, flat optical fibres are used. Flat optical fibres as lighting surfaces mostly contain transparent plastic (e.g., PMMA, acryl, etc.) and at the side surfaces are supplied with light, for example by light-emitting diodes (LEDs). Above all, in a display having a lighting surface area which has a length across its diagonal of greater than 12 inches, there is the problem that a homogeneous illumination of the entire surface is no longer, or is hardly, possible. Above all, weaker illumination occurs in the centre of the display than in the remaining screen which means that inhomogeneous directional characteristic is to be observed. Furthermore, with conventional production devices for lighting apparatuses it is complex to produce lighting apparatuses of different sizes. The production of flat lighting apparatuses is a further difficulty as the size increases.

SUMMARY OF THE INVENTION

An object to be achieved resides in the provision of a lighting apparatus which overcomes said disadvantages of the prior art.

In particular, it should be permitted to provide a lighting apparatus, by means of which screens or monitors having a length across the screen diagonal of more than 17 inches (") can be illuminated extremely homogeneously. In addition, the lighting apparatus should be able to be produced in a flexible and simple manner. The simple producibility of large-area lighting apparatuses is a further object.

A lighting apparatus according to one embodiment comprises a quadrangular lighting surface, wherein the quadrangular lighting surface has a first lateral edge a and an opposing lateral edge $a_g$, wherein the quadrangular lighting surface has a second lateral edge b and an opposing lateral edge $b_g$, wherein the quadrangular lighting surface is constructed modularly of at least a first lighting module and further lighting modules. At least the first lighting module is triangular, wherein the base surface of the first lighting module has a lateral edge b1 and a vertex E1 opposing this lateral edge b1, wherein a connecting path between the vertex E1 and an intersection point L1 of a normal line with the lateral edge b1 is a height h1 of the first lighting module, where $0 < h1 \leq a$ and b=b1.

"Quadrangular lighting surface" refers here and hereinafter to a region which has a quadrangular base surface and emits electromagnetic radiation. The lighting surface thereby has four corners and four lateral edges a, $a_g$, b and $b_g$.

According to one embodiment, the lateral edges a and $a_g$ and/or b and $b_g$ are the same length.

In the case of a lighting apparatus in accordance with the invention, a quadrangular lighting surface, in particular a back-lighting apparatus of a display, is constructed modularly of at least the first lighting module and further lighting modules. By way of a combination of several lighting modules of the same or different sizes, background illumination, through-illumination or illumination for a multiplicity of display sizes can be achieved.

"Constructed modularly" means in this context such an arrangement of the at least one first lighting module and the further lighting modules that a base surface of the first lighting module and the base surfaces of the further lighting modules when constructed form a quadrangular lighting surface. A multiplicity of differently sized lighting modules and/or a multiplicity of differently geometrically formed lighting modules can be constructed. "Constructed modularly" can also be understood as modularity, modular design or modular conception. The lighting modules can be constructed as modules of a modular kit variably to form larger units, e.g., to form a quadrangular lighting surface. The modules are formed such that particular, even different, shapes can be constructed therefrom.

The quadrangular lighting surface is thereby formed by combination of the at least first lighting module and further lighting modules, wherein the lighting modules constructed to form the lighting surface can interact with one another via corresponding interfaces. In particular, the lighting modules have standardised interfaces. Furthermore, a quadrangular lighting surface, which is constructed modularly from at least the first lighting module and further lighting modules, offers increased flexibility and/or variation when different compatible lighting modules are provided which can be attached, removed, changed or otherwise grouped in order to adapt the quadrangular lighting surface of the lighting apparatus to new conditions.

Furthermore, lighting modules which are faulty can be easily dismantled and replaced with new lighting modules, wherein the assembly of the new lighting modules is simple and cost-effective. Changes within a lighting module, e.g., the first lighting module, do not have an effect on the other lighting modules.

Moreover, flexible production at low cost is permitted. A lighting apparatus according to one embodiment produces homogeneous illumination of the entire lighting surface and thus of the entire display.

According to a further embodiment, the lighting surface of the lighting apparatus is rectangular, square, trapezoidal or parallelogram-shaped. In particular, the lighting surface is rectangular or quadratic.

In particular, the quadrangular lighting surface is rectangular with a=$a_g$ and b=$b_g$, wherein all the internal angles of the rectangle are 90°. If the quadrangular lighting surface is square, then a=$a_g$=b=$b_g$, wherein all the internal angles of the square are 90°. If the quadrangular lighting surface is trapezoidal, then a≠$a_g$ and b=$b_g$ or a=$a_g$ and b≠bg, wherein the lateral edges of different lengths extend in parallel with each other. In the case of a quadrangular lighting surface which is parallelogram-shaped, the opposing lateral edges a and $a_g$ or b and $b_g$ extend in parallel with each other.

In particular, the geometry of the lighting surface corresponds to the shape of the display. In a particularly preferred manner, at least one display and the quadrangular lighting surface are congruent with each other. "Congruent" refers here and hereinafter to the congruency of the triangles with respect to each other. Therefore, displays of different shapes can also be back-illuminated simply and in a flexible manner. In addition, the lighting apparatus is then invisible to a viewer who is observing the display from the front.

"Lighting module" refers here and hereinafter to a unit or component which is able to emit electromagnetic radiation. As a result, a display, e.g., a monitor display, such as a liquid crystal display (LCD), which itself does not illuminate, can be back-illuminated.

According to one embodiment, at least the first lighting module can be formed as an optical fibre or reflector.

Here and hereinafter, electromagnetic radiation, in particular electromagnetic radiation having one or several wavelengths or wavelength ranges from the ultraviolet to the infrared spectral range, can also be referred to as light. Light can be in particular visible light and include wavelengths or wavelength ranges from a visible spectral range between approximately 350 nm and approximately 800 nm.

In particular, the lighting apparatus emits blue, green, red, yellow electromagnetic radiation or a combination thereof. In particular, the lighting apparatus emits white light.

Here and hereinafter, details relating to colour in respect of an emitting lighting apparatus refer to the respective spectral range of the electromagnetic radiation.

Light having a chromaticity co-ordinate which corresponds to the chromaticity co-ordinate of a Planck blackbody radiator can be referred to here and hereinafter as white light or light having a white light impression or colour impression. Furthermore, a light impression referred to here and hereinafter as a white light impression can be caused by light which has a colour rendering index (CRI), known to a person skilled in the art, of greater than or equal to 60, preferably greater than or equal to 80 and particularly preferably greater than or equal to 90.

The first lighting module forms a triangular base surface. The triangular base surface is produced from the lateral edge b1 of the triangle of the first lighting module and the vertex E1 opposing this lateral edge b1, wherein the connecting path between the vertex E1 and an intersection point L1 of a normal line with the lateral edge b1 produces a height h1. The "intersection point L1 of a normal line" lies on the lateral edge b1 and is a straight line which is perpendicular to the lateral edge b1. Intersection point of a normal line can also be referred to as perpendicular. Intersection point of a normal line also refers to the intersection point of the perpendicular to the vertex with the lateral edge b1. "Connecting path" refers to a straight line between the vertex E1 and the intersection point L1 of a normal line.

According to one embodiment, the vertex E1 of the first lighting module corresponds to a point on the opposing lateral edge $b_g$ of the quadrangular lighting surface. In particular, h1=a. The quadrangular lighting surface thereby comprises in particular right (internal) angles. Therefore, a quadrangular lighting surface, e.g., a rectangular or square lighting surface, is constructed modularly by three triangular lighting modules. The triangular lighting modules thereby contain at least the first lighting module. The two further lighting modules are right-angled triangles. In particular, these right-angled triangles each have a height which corresponds to the lateral edge a and/or $a_g$.

According to one embodiment, light-emitting diodes (LEDs) can be arranged at the lateral edges b and/or $b_g$ and/or a and/or $a_g$ of the quadrangular lighting surface or of the lighting modules. As a result, electromagnetic radiation can be homogeneously emitted with a constant light density. This results in the fact that electromagnetic radiation can also be homogeneously emitted by the lighting apparatus and thus at least one display can be homogeneously through-illuminated or illuminated. Furthermore, LEDs which have a different brightness can be used, wherein a wider production capability having a variable LED arrangement can be applied.

According to one embodiment, the further lighting modules have a geometry which is selected from the group comprising triangles, quadrangles, squares, trapezoids, parallelograms and combinations thereof. This permits a simple modular arrangement of the lighting modules which results in a quadrangular lighting surface. Therefore, quadrangular lighting modules and/or triangular lighting modules, when constructed modularly, produce a quadrangular lighting surface.

According to one embodiment, the further lighting modules include a second lighting module which is a triangle, wherein the base surface of the second lighting module has a lateral edge b2 and an opposing vertex E2, wherein the connecting path between the vertex E2 and an intersection point L2 of a normal line is the height h2 of the second lighting module which is perpendicular to the lateral edge b2, where: $0 \leq h2 \leq a$. In particular, the second lighting module has a lateral edge b2, where: $b2=b_g$. The definition of the intersection point L1 of a normal line and the connecting path between the vertex E1 and an intersection point L1 of a normal line applies, mutatis mutandis, to the intersection point L2 of a normal line and the connecting path between the vertex E2 and an intersection point L2 of a normal line.

According to one embodiment, the vertex E1 of the triangle of the first lighting module corresponds to the vertex E2 of the triangle of the second lighting module.

According to one embodiment, the following equations apply: E1=E2 and h1=h2=a/2 and h1+h2=a, b1=b, $b2=b_g$ and $b=b_g$. b1=b means here and hereinafter that the lateral edge b of the quadrangular lighting surface corresponds to the lateral edge b1 of the first lighting module. This applies, mutatis mutandis, for the expression $b2=b_g$. $b=b_g$ means here and hereinafter that the opposing lateral edges b and $b_g$ have the same magnitude but are not identical. In particular, for a quadrangular lighting surface which is rectangular: E1=E2=a/2=b/2.

Comparisons (greater than, less than or equals signs) between at least one lateral edge a, $a_g$, b and/or $b_g$ of the quadrangular lighting surface and the heights h1 and/or h2 of the lighting modules always refer to the mutual length ratios thereof.

According to one embodiment, the quadrangular lighting surface has an edge parallel which extends in parallel with the first lateral edge a of the quadrangular lighting surface and includes the heights h1 and h2 of the first and second lighting modules, where: $a/2 \geq h1 \geq a/4$ and/or $a/2 \geq h2 \geq a/4$ and/or h1+h2=a.

According to a further embodiment, a quadrangular lighting surface can be constructed modularly from four triangular lighting modules or from two triangular lighting modules and two trapezoidal lighting modules.

According to one embodiment, the following equations apply: $h1=h2 \leq a/4$ and $b1=b2=b=b_g$ and h1+h2=a or $h1=h2 \geq a/4$ and $b1=b2=b=b_g$ and h1+h2=a. $b1=b2=b=b_g$ means here and hereinafter that the lateral edges b1, b2, b and $b_g$ have the same magnitude, where b1=b and $b2=b_g$. h1+h2=a means here and hereinafter that, in terms of magnitude, the sum of the length of the heights h1 and h2 produces the length of the lateral edge a. $h1=h2 \leq a/4$ or $h1=h2 \geq a/4$ means in this context that the length of the height h1 and/or h2 corresponds to less than or equal to, or greater than or equal to respectively, a quarter of the length of the lateral edge a.

According to one embodiment, at least some of the first, second and/or further lighting modules or all the lighting modules comprise a light coupling-in part having light-emitting diodes. In contrast to a conventional lighting apparatus which consists of an individual lighting plate, a more homogeneous distribution of the power dissipation and thus of the generated heat can be achieved over the entire lighting apparatus since the light-emitting diodes are arranged not only at the edge of the lighting surface but also within the lighting surface at the transition between individual lighting modules. The light coupling-in part is configured such that within the light coupling-in part the light beams traverse, before entering the lighting body, the upper side of which is delimited by the light exit surface, a certain path in which a radiation homogenisation occurs. The surface of the light coupling-in part is not included in the light exit surface.

According to a further embodiment, all the lighting modules comprise a light coupling-in part having light-emitting diodes. This has the advantage that without a great deal of additional manufacturing outlay, principally an extremely homogeneous light-emitting lighting surface can be achieved by joining together the individual lighting modules. The modular design allows in this case larger lighting surfaces to be constructed from smaller "standard modules" (lighting modules) in a simple manner.

According to one embodiment, the lighting apparatus is configured such that it fits all current monitor sizes and shapes and can back-illuminate the monitors. The lighting apparatus and at least one display can be spaced apart from each other or be in direct contact with another. In particular, more than two, for example 4 or 6, displays can be illuminated by the lighting apparatus.

"Direct contact" can mean here and hereinafter that the lighting apparatus is arranged immediately in direct mechanical contact on the at least one display. Furthermore, it can also mean that the lighting apparatus is arranged indirectly behind the at least one display. Further layers, regions and/or elements can then be arranged between the lighting apparatus and the at least one display.

In particular, the at least one display and the quadrangular lighting surface of the lighting apparatus are arranged such that they are congruent with respect to one another.

According to a further embodiment, the quadrangular lighting surface is rectangular or square and is constructed modularly from the first and second lighting modules, or the quadrangular lighting surface is trapezoidal and is constructed modularly from the first and second lighting modules and a further lighting module.

According to a further embodiment, the first lighting module and/or the second lighting module and/or the further lighting modules are constructed modularly from at least further lighting module subunits. "Lighting module subunit" defines here and hereinafter a unit or component which is able to emit electromagnetic radiation, wherein at least two lighting module subunits produce a higher-level lighting module, e.g., a first lighting module and/or a further lighting module. Therefore, a lighting module differs from a lighting module subunit by the size ratio therebetween. The following is applicable: the ratio of the size of the lighting module to the size of the lighting module subunit is always greater than 1. The geometry of a lighting module can be identical compared with the geometry of a lighting module subunit.

According to a further embodiment, the further lighting module subunits are triangular, quadrangular, square, trapezoidal and/or parallelogram-shaped. Here and hereinafter, the same definitions for triangular, quadrangular, square, trapezoidal and/or parallelogram-shaped as those described earlier for the geometry of the lighting surface or of the first lighting module or of the further lighting module are applicable.

According to one embodiment, the first and/or second lighting module and/or the further lighting modules comprise at least one outer surface which is not a light exit surface or a light entry surface, and is at least partially provided with a reflective coating. Therefore, in particular the base surfaces, the lateral surfaces and the part of the upper surface of the light coupling-in part on which no LEDs are mounted are coated. The light exit surface and the light entry surface between the LEDs and the light coupling-in part are not coated. The light exit surface can be provided with a structure (e.g., dots, lines, V-shaped notches, lenses, etc.) which is used for additional homogenisation of the light distribution.

In a particularly preferred variant of the lighting apparatus according to the invention, a lighting body of the lighting module is provided, the cross-section of which tapers as the distance from the light coupling-in part increases. Light body refers here and hereinafter to a body whose light exit surface can be identical to the base surface or size of at least one lighting module. The base surface or size of the lighting module or of the lighting module subunit corresponds to the height and width of the body. The body additionally comprises a depth or a spatial shape. The convergence of the light exit surface and the base surface of the lighting modules towards the end region ensures that the light supplied by the LEDs in the light coupling-in part does not substantially pass through the lighting module to the end region owing to total reflection without leaving the lighting module. Instead, the tapering shape of the lighting modules contributes to the light produced in the LEDs substantially homogeneously appearing on the entire light exit surface of the lighting modules.

In a particularly preferred embodiment, the individual lighting modules are configured such that the thickness of the lighting body adjacent to the light coupling-in part is greater than the thickness of the light coupling-in part. As a result, there is a step between the light coupling-in part and the light exit surface of the lighting module, into which an adjacent lighting module can engage so that the lighting modules can overlap when constructing a lighting surface such that light coupling-in parts located beneath the lighting surface are covered. This ensures that the overall surface of the quadrangular lighting surface of the lighting apparatus actually corresponds to the sum of the surfaces of the individual lighting modules and the lighting surfaces formed by the light exit surfaces of the individual lighting modules is substantially flat.

In a preferred embodiment, a lighting module comprises a base surface opposing the light exit surface, a reflection structure which, in operation, directs light emitted by the LEDs in the region of the step. As a result, sufficient illumination in the region of the step is achieved in a simple manner.

According to a further embodiment, a use of a lighting apparatus is provided, wherein the lighting apparatus is used for background illumination of one or more displays. The lighting apparatus is in direct contact with at least one display or is spaced apart from the at least one display. The distance between the at least one display and the lighting apparatus preferably amounts to 0.05 mm to 5 mm. The distance is dependent upon the additional layers and/or elements used.

The same definitions and embodiments of the use of the lighting apparatus as described above in the description for the lighting apparatus are applicable.

A method for producing a lighting apparatus is also provided, wherein the lighting apparatus has a quadrangular lighting surface. The quadrangular lighting surface has a first lateral edge a and an opposing lateral edge $a_g$, wherein the quadrangular lighting surface has a second lateral edge b and an opposing lateral edge $b_g$. The quadrangular lighting surface is constructed modularly from at least one first lighting module and further lighting modules. The at least first lighting module is triangular, wherein the base surface of the first lighting modular has a lateral edge b1 and a vertex E1 opposing this lateral edge b1, wherein a connecting path between the vertex E1 and an intersection point L1 of a normal line with the lateral edge b1 is a height h1 of the first lighting module, where: 0≤h1≤a and b=b1.

The same definitions and embodiments of the production of the lighting apparatus as described above in the description for the lighting apparatus are applicable.

BRIEF DESCRIPTION OF THE DRAWINGS

Further advantages and advantageous embodiments and developments of the subject matter according to the invention are apparent from the exemplified embodiments described hereinafter in conjunction with the figures, in which.

DETAILED DESCRIPTION OF THE DRAWINGS

Figure 1:
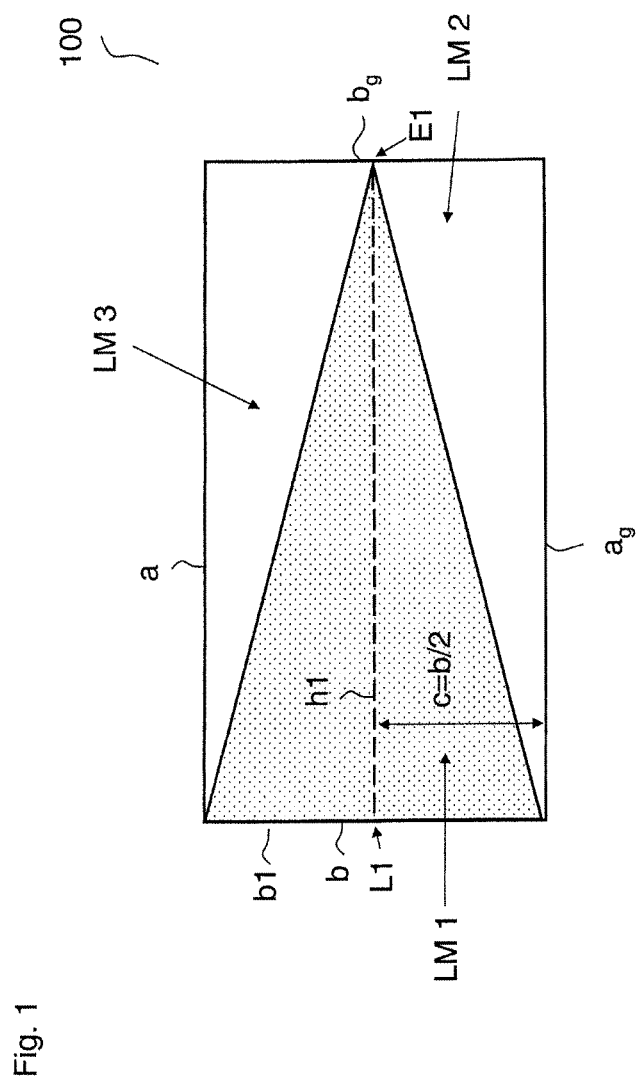
FIG. 1 shows a schematic illustration of a top view of a quadrangular lighting surface according to one embodiment.

FIG. 1 shows a schematic illustration of a top view of a quadrangular lighting surface 100 according to one embodiment. The quadrangular lighting surface, in this case a rectangular lighting surface, comprises the lateral edges a, $a_g$, b, $b_g$. In principle, it is possible for the quadrangular lighting surface to also be configured to be trapezoidal, square or parallelogram-shaped. The quadrangular lighting surface in FIG. 1 is constructed from three lighting modules.

The three lighting modules include the first lighting module LM1 has a triangular surface having the lateral edge b1, the height h1 and the vertex E1. The first lighting module LM1 is an isosceles triangle. Hence: b=b1. The vertex E1 of the first lighting module LM1 lies on the lateral edge $b_g$. The vertex E1 bisects the lateral edge $b_g$. The first lighting module LM1 is constructed modularly with two further lighting modules LM2 and LM3 so that a quadrangular, in this case rectangular, lighting surface is produced. The two further lighting modules LM1 and LM2 are triangular, wherein these each form a right-angled triangle with the lateral edges $b_g/2$ and a or $a_g$. The angle of 90° of the two further lighting modules LM2 and LM3 is formed by the two lateral edges $b_g/2$ and a or $a_g$. In particular, the quadrangular lighting surface has a length-to-width ratio a:b of 4:3 or 16:9 or 16:10. A different length-to-width ratio a:b, e.g., 21:9, is not precluded. In this exemplified embodiment, it can be seen how three triangular lighting modules can produce a quadrangular lighting surface. These three lighting modules can be constructed in a simple and flexible manner to form a quadrangular lighting surface.

Figure 2:
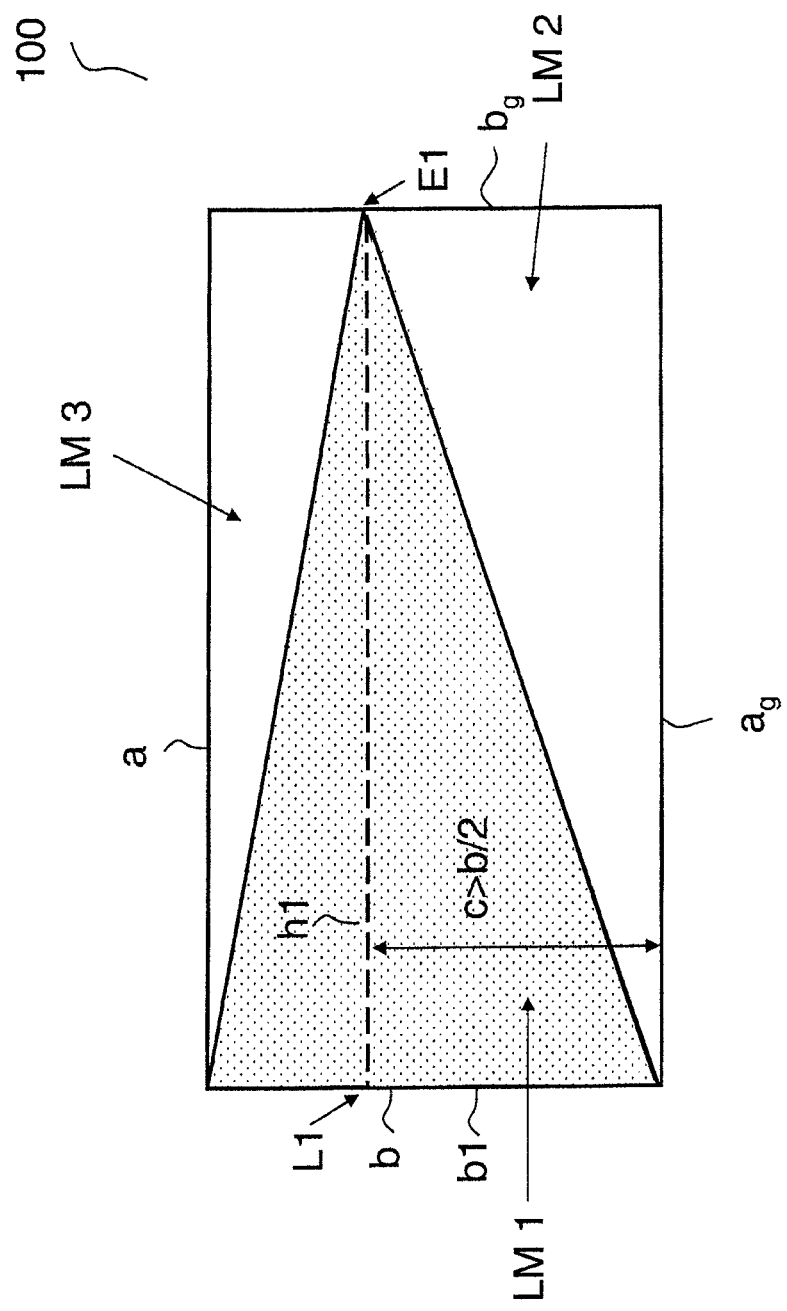
FIG. 2 shows a schematic illustration of a top view of a quadrangular lighting surface according to one embodiment.

Like FIG. 1, FIG. 2 also shows a schematic illustration of a top view of a quadrangular lighting surface 100 according to a further exemplified embodiment. The quadrangular lighting surface 100 of FIG. 2 differs from the quadrangular lighting surface 100 of FIG. 1 in that the first lighting module LM1 is not an isosceles triangle and although the vertex E1 of the first lighting module LM1 is located on the lateral edge $b_g$, it does not bisect this lateral edge $b_g$. Therefore, three triangular lighting modules LM1 to LM3 of different sizes, when constructed modularly, produce a quadrangular, in this case rectangular, lighting surface.

Figure 3:
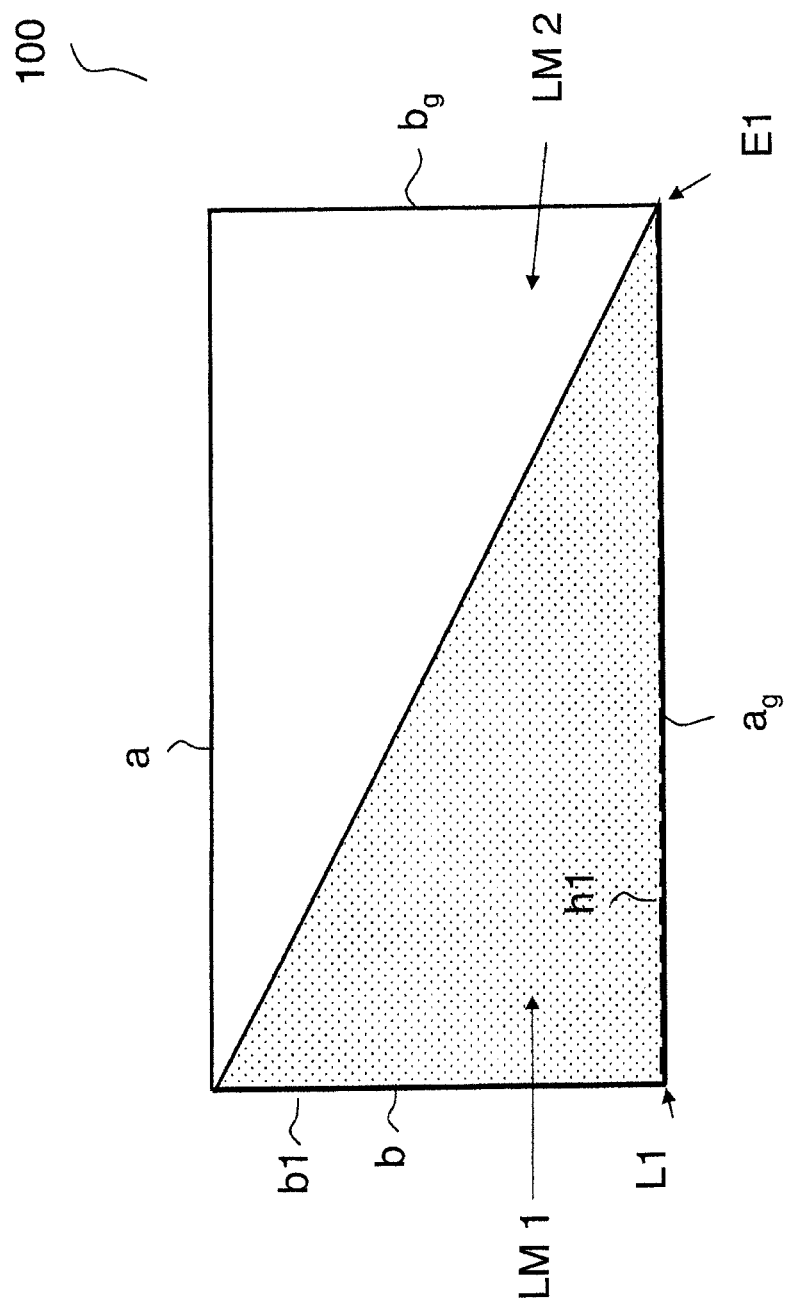
FIG. 3 shows a schematic illustration of a top view of a quadrangular lighting surface according to one embodiment.

Like FIG. 1, FIG. 3 also shows a schematic illustration of a top view of a quadrangular lighting surface 100 according to a further exemplified embodiment. The quadrangular lighting surface in FIG. 3 is constructed from two lighting modules. The two lighting modules include the first lighting module LM1 which has a triangular surface having the lateral edge b1, the height h1 and the vertex E1. The first lighting module LM1 is a right-angled triangle.

Hence: b=b1, h1=$a_g$. The lateral edge of the first lighting module LM1, which opposes the intersection point L1 of a normal line, corresponds to a diagonal of the quadrangular lighting surface. Located on the lateral edge $b_g$ is the vertex E1 of the first lighting module LM1 which corresponds to a vertex of the quadrangular lighting surface. The first lighting module LM1 is constructed modularly with a further lighting module LM2, so that a quadrangular, in this case rectangular, lighting surface is produced. The further lighting module LM2 is likewise triangular, wherein LM1 and LM2 are the same size.

Figure 4:
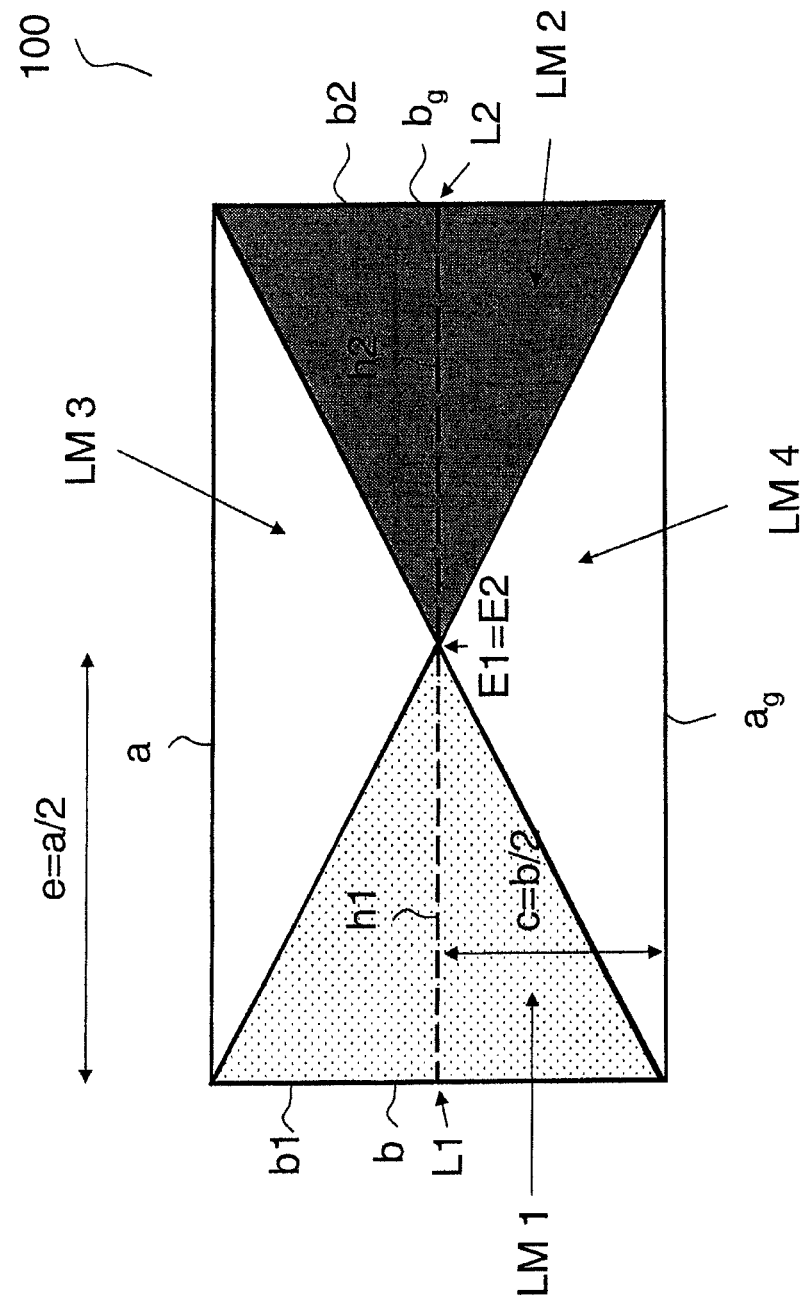
FIG. 4 shows a schematic illustration of a top view of a quadrangular lighting surface according to one embodiment.

FIG. 4 shows a schematic illustration of a top view of a quadrangular lighting surface 100 according to one embodiment. A quadrangular lighting surface having the lateral edges a, $a_g$, b and $b_g$ is constructed modularly from four lighting modules LM1 to LM4. The first lighting module LM1 is triangular and has a lateral edge b1, a vertex E1 and a height h1. The lighting module LM2 is triangular, has a lateral edge b2, a vertex E2 and a height h2. Hence: b1=b2=b=$b_g$, E1=E2, h1=h2=a/2 and h1+h2=a. The third lighting module LM3 and the fourth lighting module LM4 are likewise each configured to be triangular and have a lateral edge a or $a_g$ and a height of the respective triangle arranged perpendicular to the lateral edge a or $a_g$ and having a length b/2. In that case: a=$a_g$. Therefore, a quadrangular lighting surface can be constructed from four triangular lighting modules in a simple and flexible manner. In this case, the first lighting module LM1 and the second lighting module LM2 or the third lighting module LM3 and the fourth lighting module LM4 are congruent. It would also be feasible for the quadrangular lighting surface to be formed from four differently sized triangular lighting modules. The height h1 refers in this case to the connecting path between the vertex E1 and the intersection point L1 of a normal line. The height h2 refers in this case to the connecting path between the vertex E2 and the intersection point L2 of a normal line. "e" refers to half the length of the lateral edge a of the quadrangular lighting surface. "c" refers to half the length of the lateral edge b of the quadrangular lighting surface.

Figure 5:
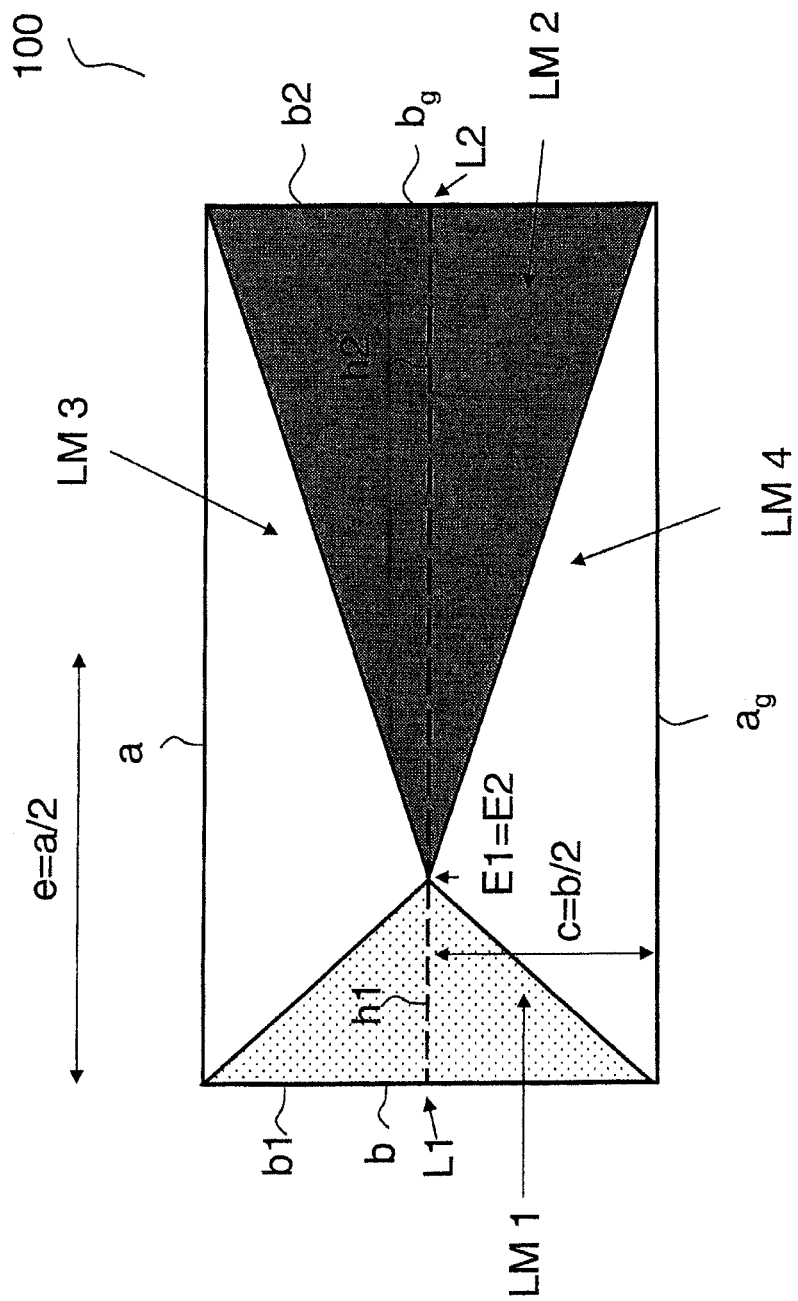
FIG. 5 shows a schematic illustration of a top view of a quadrangular lighting surface according to one embodiment.

FIG. 5 shows a schematic illustration of a top view of a quadrangular lighting surface 100 according to one embodiment. The quadrangular lighting surface 100 of FIG. 5 differs from the quadrangular lighting surface 100 of FIG. 4 in that in this case: h1≠h2. Therefore, at least the first lighting module LM1 and the second lighting module LM2 are no longer congruent with each other and are of different sizes or have different heights. In contrast, the third lighting module LM3 and the fourth lighting module LM4 are still congruent with each other. "Congruent" refers here and hereinafter to the congruence of the triangles with each other. Lighting modules are congruent with each other when they can be moved one inside the other by congruence mapping. In addition to movement, congruence mapping also includes parallel translation, rotation, reflection and composition of this mapping. Therefore, a quadrangular lighting surface can be constructed modularly from four triangular lighting modules, wherein at least two lighting modules are not congruent with each other. It is also feasible for all four lighting modules to have different sizes and for none of the lighting modules to be congruent with a further lighting module.

Figure 6:
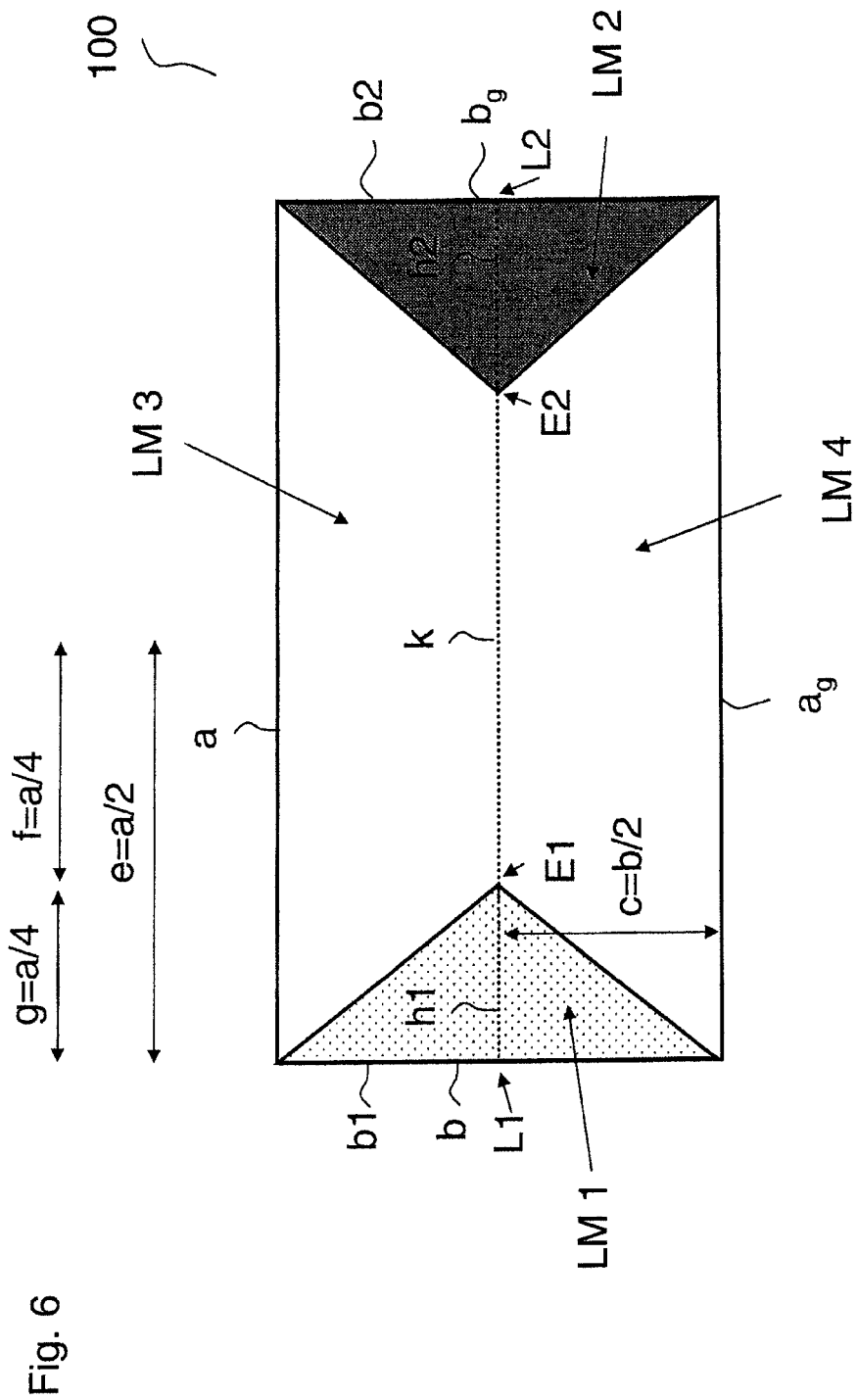
FIG. 6 shows a schematic illustration of a top view of a quadrangular lighting surface according to one embodiment.

FIG. 6 shows a schematic illustration of a top view of a quadrangular lighting surface 100 according to one embodiment. In this exemplified embodiment, the quadrangular lighting surface 100 has an edge parallel k which extends in parallel with the first lateral edge a of the quadrangular lighting surface and includes the heights h1 and h2 of the first and second lighting modules. In this case, the edge parallel k is at b/2. Hence: a/2≥h1≥a/4 and a/2≥h2≥a/4 and/or h1+h2≤a. In particular, h1=h2=a/4. Therefore, a quadrangular lighting surface can be constructed modularly from four lighting modules, wherein at least two lighting modules, e.g., the first lighting module LM1 and the second lighting module LM2 or the third lighting module LM3 and the fourth lighting module LM4, are congruent or are not congruent with each other. The first lighting module LM1 and the second lighting module LM2 are triangular and the third lighting module LM3 and the fourth lighting module LM4 are trapezoidal. It would be feasible for the lighting modules to be subdivided into further lighting module subunits which are triangular, quadrangular, square, trapezoidal and/or parallelogram-shaped. Thus, for example, the first lighting module LM1 and/or the second lighting module LM2 can be subdivided into further small triangles or triangles and squares or rectangles. The trapezoidal third lighting modules LM3 and the fourth lighting module LM4 can be subdivided for example into a quadratic lighting module subunit and two triangular lighting module subunits in each case. A different arrangement of lighting module subunits is likewise feasible. "f" or "g" refers to a quarter of the length of the lateral edge a of the quadrangular lighting surface.

Figure 7:
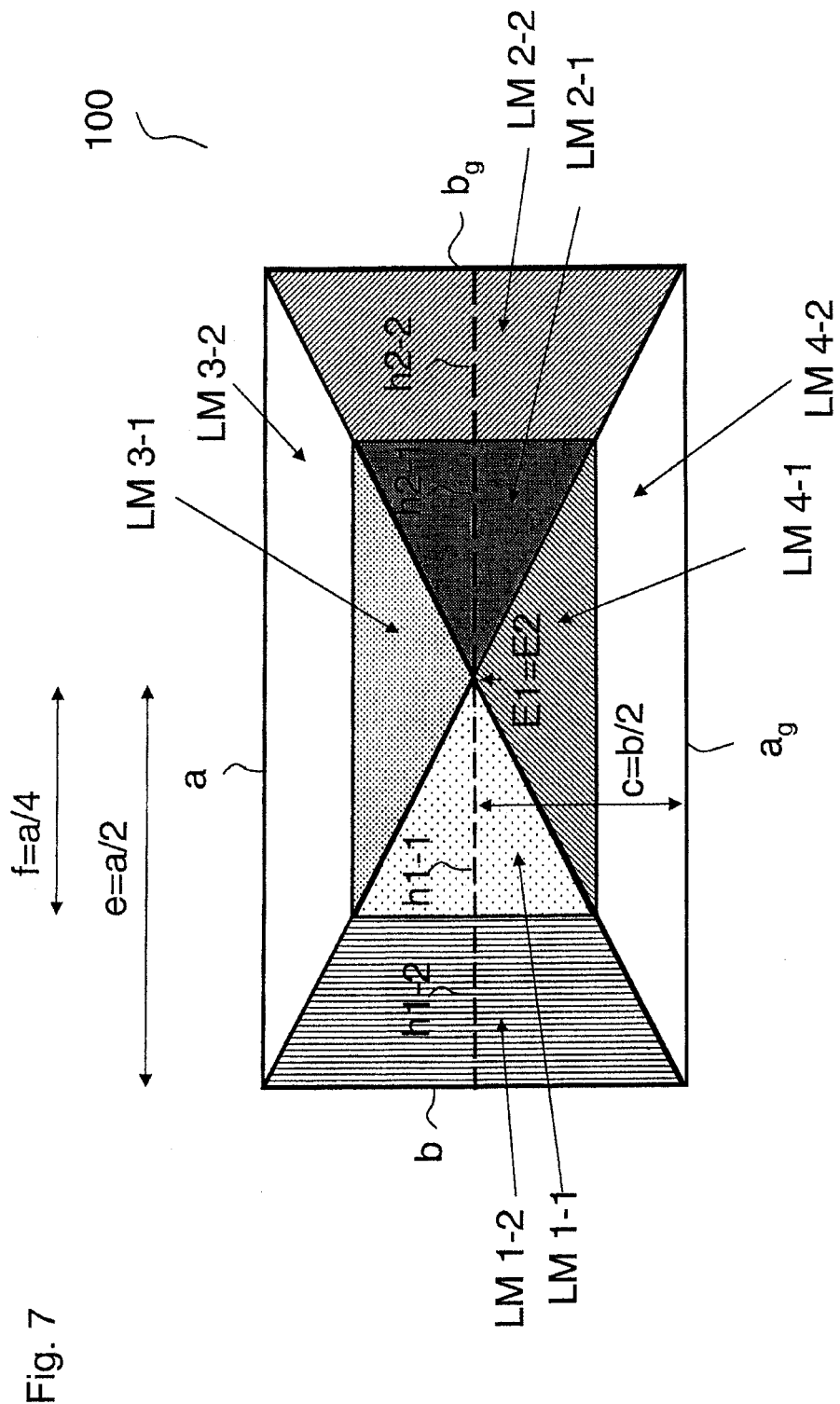
FIG. 7 shows a schematic illustration of a top view of a quadrangular lighting surface according to one embodiment.

FIG. 7 shows a schematic illustration of a top view of a quadrangular lighting surface 100 according to one embodiment. The first, second, third and fourth lighting modules LM1 to LM4 corresponding to the embodiment illustrated in FIG. 4 can be constructed from lighting module subunits. For instance, the first lighting module LM1 can be constructed modularly from the lighting module subunits LM1-1 and LM1-2. The second lighting module LM2 is constructed modularly from the lighting module subunits LM2-1 and LM2-2. The third lighting module LM3 is constructed modularly from the lighting module subunits LM3-1 and LM3-2. The fourth lighting module LM4 is constructed modularly from the lighting module subunits LM4-1 and LM4-2. The lighting module subunits LM1-1, LM2-1, LM3-1 and LM4-1 are triangular and the lighting module subunits LM1-2, LM2-2, LM3-2 and LM4-2 are trapezoidal. Modularly joining together the lighting module subunits produces the respective lighting modules and thus the quadrangular lighting surface. In particular, the lighting module subunits LM1-1 and LM2-1 or LM3-1 and LM4-1 are congruent with each other. The same is true for the lighting module subunits LM1-2 and LM2-2 or LM3-2 and LM4-2. "h1-1" refers in FIG. 7 to the corresponding height of the lighting module subunit LM1-1. "h1-2" refers in FIG. 7 to the corresponding height of the lighting module subunit LM1-2. Analogous statements apply for the lighting module subunits LM2-1, LM2-2, LM3-1, LM3-2, LM4-1 and LM4-2. In particular: h1=h1-2+h1-1 and/or h2=h2-1+h2-2. In particular: h1-1=a/4.

Figure 8:
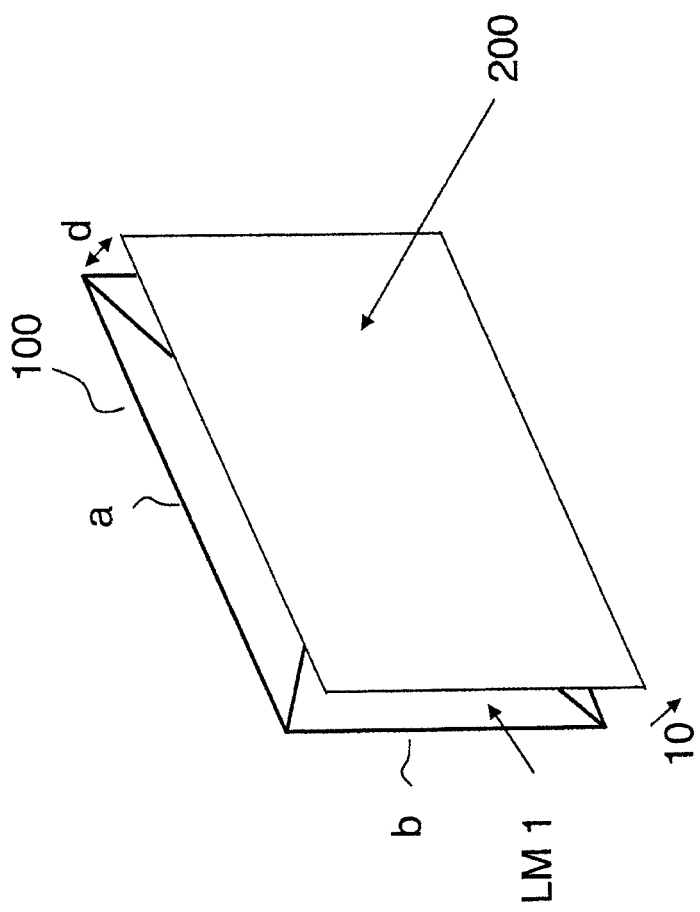
FIG. 8 shows a schematic illustration of a lateral view of a quadrangular lighting surface according to one embodiment, which is arranged behind a display.

FIG. 8 shows a schematic illustration of a lateral view of a quadrangular lighting surface 100 according to one embodiment, which is arranged behind a display 200. The at least one display can be at a distance d from the quadrangular lighting surface 100. It is particularly preferred if d amounts to 0 mm to 5 mm, in particular 0.05 mm to 5 mm. Therefore, with d=0, the at least one display 200 can be in direct contact with the quadrangular lighting surface 100. Alternatively, the at least one display can be spaced apart from the quadrangular lighting surface 100 with d>0, for example d amounts to 0.05 mm to 5 mm. The distance is thereby dependent upon the additional layers and/or elements used.

Figure 9:
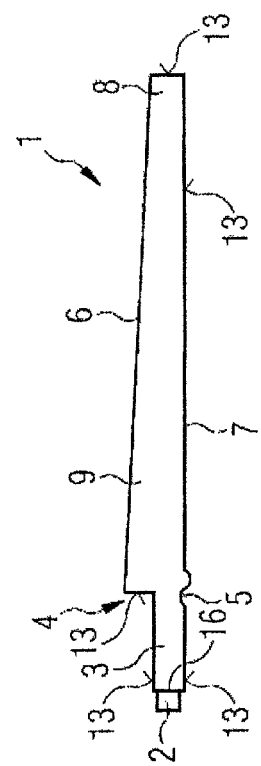
FIG. 9 shows a schematic illustration of a cross-section through a lighting module according to one embodiment.

FIG. 9 shows a schematic illustration of a cross-section through a lighting module which is equipped with LEDs, which, at an end side of the light coupling-in part 3, couples light into the first lighting module or further lighting modules 1. Homogenisation of the light emitted by the LEDs 2 takes place in the light coupling-in part 3 before the radiation enters the lighting body 9.

The tapering cross-section of the lighting body 9 ensures that light exits via the entire light exit surface.

All the surfaces, through which—in contrast to the light exit surface 6 and the light entry surface 16 between the LEDs and light coupling-in part—light does not have to pass during operation, are preferably provided with a reflective coating 13, which can substantially prevent crosstalk between the lighting modules via lateral surfaces and/or reduce losses.

A reflective structure 5 on or in the base surface 7 of the lighting body between the light coupling-in part 3 and the lighting body 9 facilitates the fact that light passes through reflection directly behind the step 4 to the light exit surface. The reflective structure can be developed for example in a wavelike manner. However, any other structure which facilitates the avoidance of weaker illumination of the lighting body in the region of the step is suitable.

FIG. 9 shows that the end region 8 of the lighting module has the same thickness as the height of the step 4. This ensures a planar lighting surface after a plurality of individual lighting modules are joined together, as can be seen by way of example in the top view in FIGS. 1 to 7 and in the cross-section in FIG. 11.

Figure 10:
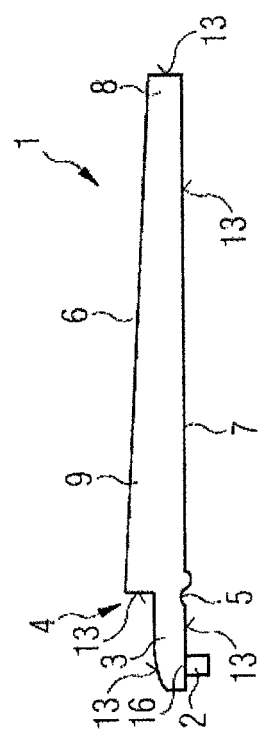
FIG. 10 shows a schematic illustration of a cross-section through a first lighting module or a further lighting module according to one embodiment.

FIG. 10 shows a schematic illustration of a cross-section through a first lighting module or a further lighting module or a lighting module subunit. A substantial difference with respect to the lighting module described in FIG. 9 resides in the fact that the light is coupled into the light coupling-in part 3 via the base surface 7 of the lighting module or of the lighting body. In order to ensure that the light is coupled into the entire lighting module, the side opposing the LEDs is shaped to be parabolic or parabola-shaped in the light coupling-in part 3. The light emitted by the LEDs 2 is directed at this parabolic or parabola-shaped side into the lighting body 9 of the lighting module 1. Step 4 and end region 8 of the lighting module have a height or thickness such that individual lighting modules LM1, LM2, LM3, LM4 or lighting module subunits can be joined together such that a planar upper surface of the lighting surface of the lighting apparatus is produced.

Figure 11:
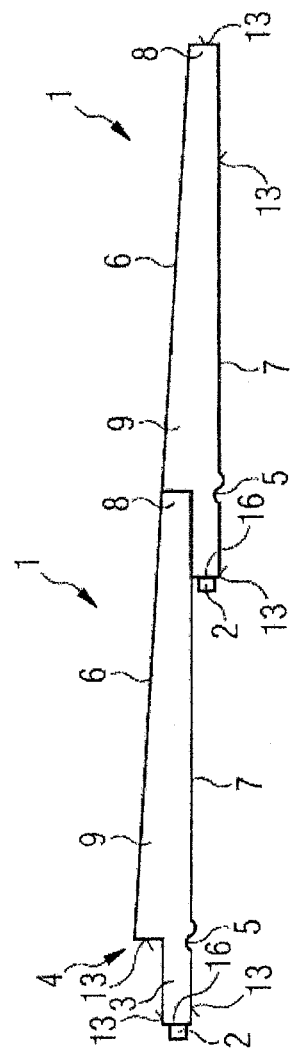
FIG. 11 shows a schematic illustration of a cross-section of two joined together lighting modules according to one embodiment.

FIG. 11 shows a schematic illustration of a cross-section of two joined together lighting modules or lighting module subunits.

In this figure, it is shown by way of example how two lighting modules (1) overlap when constructing a lighting surface such that the light coupling-in part 3 is covered by the adjacent lighting module. A substantially planar lighting surface is produced.

The invention can also be applied to all methods and lighting apparatuses which comprise the basic features of the main claim of the invention. In particular, it can be used for lighting apparatuses which do not conform to the standard of a surface diagonal which has a length of an integer number of inches. Owing to the other standards of illuminated objects allowed on the market, such as monitors for example, other dimensions of lighting surfaces and thus individual lighting modules may be required.

Moreover, a multiplicity of different LEDs which couple light into the individual lighting modules can be used. Furthermore, different brightnesses and colours of individual LEDs can be combined. All reflective materials, e.g., the conventional reflective materials, and different materials for the lighting bodies can be used.

Finally, within the scope of the invention, it is advantageous, but not absolutely necessary, to use LEDs as light sources. Other light sources, preferably the above-mentioned light sources such as, for example, cold-cathode lamps in the form of cold-cathode fluorescent lamps (CCFLs) or neon tubes, organic light-emitting diodes (OLEDs) or electroluminescent films can also be provided instead of LEDs.

The invention is not limited by the description using the exemplified embodiments. Rather, the invention also includes individual new features and any combination of features, included in particular in any combination of features in the claims, even if this feature or this combination itself is not explicitly stated in the claims or exemplified embodiments.

The invention claimed is:

1. A lighting apparatus comprising:
a quadrangular lighting surface,
wherein the quadrangular lighting surface has a first lateral edge a and an opposing lateral edge $a_g$,
wherein the quadrangular lighting surface has a second lateral edge b and an opposing lateral edge $b_g$,
wherein the quadrangular lighting surface is constructed modularly from at least three lighting modules comprising a first lighting module and further lighting modules, wherein the lighting modules interact with one another via corresponding interfaces so that the lighting modules can be easily and/or flexibly attached, removed, changed or otherwise grouped,
wherein at least the first lighting module is triangular,
wherein none of the lighting modules is rectangular,
wherein the base surface of the first lighting module has a lateral edge b1 and a vertex E1 opposing this lateral edge b1,
wherein a connecting path between the vertex E1 and an intersection point L1 of a normal line with the lateral edge b1 is a height h1 of the first lighting module, where $0<h1 \leq a$ and b=b1.

2. The lighting apparatus according to claim 1, wherein the lighting surface is rectangular, square, trapezoidal or parallelogram-shaped.

3. The lighting apparatus according to claim 1, wherein the vertex E1 of the first lighting module corresponds to a point on the opposing lateral edge $b_g$ of the quadrangular lighting surface.

4. The lighting apparatus according to claim 1, wherein the further lighting modules have a geometry which is selected from the group comprising triangles, trapezoids, parallelograms and combinations thereof.

5. The lighting apparatus according to claim 1, wherein the further lighting modules include a second lighting module, wherein the second lighting module is a triangle, wherein the base surface of the second lighting module has a lateral edge b2 and an opposing vertex E2, wherein a connecting path between the vertex E2 and an intersection point L2 of a normal line with the lateral edge b2 is a height h2 of the second lighting module, where $0 \leq h2 \leq a$.

6. The lighting apparatus according to claim 5, wherein the vertex E1 of the triangle of the first lighting module corresponds to the vertex E2 of the triangle of the second lighting module.

7. The lighting apparatus according to claim 5, wherein the following equations apply: E1=E2 and h1=h2=a/2 and h1+h2=a, b1=b, b2=$b_g$ and b=$b_g$.

8. The lighting apparatus according to claim 5, wherein the quadrangular lighting surface has an edge which extends in parallel with the first lateral edge a of the quadrangular lighting surface and includes the heights h1 and h2 of the first and second lighting modules, where: $a/2 \geq h1 \geq a/4$ and/or $a/2 \geq h2 \geq a/4$ and/or $h1+h2 \leq a$.

9. The lighting apparatus according to claim 8, wherein the following equations apply: $h1=h2 \leq a/4$ and b1=b2=b=$b_g$ and h1+h2=a or $h1=h2 \geq a/4$ and b1=b2=b=$b_g$ and h1+h2=a.

10. The lighting apparatus according to claim 5, wherein at least some of the first, second and/or the further lighting modules or all the lighting modules have a light coupling-in part having light-emitting diodes.

11. The lighting apparatus according to claim 5, wherein the quadrangular lighting surface is rectangular or square and is constructed modularly from the first and second lighting module, or wherein the quadrangular lighting surface is trapezoidal and is constructed modularly from the first and second lighting module and a further module.

12. The lighting apparatus according to claim 5, wherein the first lighting module and/or the second lighting module and/or the further lighting modules are constructed modularly from at least further lighting module subunits.

13. The lighting apparatus according to claim 12, wherein the further lighting module subunits are triangular, trapezoidal and/or parallelogram-shaped.

14. The lighting apparatus according to claim 5, wherein the first and/or second lighting module and/or the further lighting modules have at least one outer surface which is not a light exit surface or a light entry surface and is at least partially provided with a reflective coating.

15. Arrangement comprising:
- at least one display; and
- a lighting apparatus, comprising a quadrangular lighting surface,
- wherein the lighting apparatus is in direct contact with the at least one display or is spaced apart from the at least one display,
- wherein the quadrangular lighting surface has a first lateral edge a and an opposing lateral edge $a_g$,
- wherein the quadrangular lighting surface has a second lateral edge b and an opposing lateral edge $b_g$,
- wherein the quadrangular lighting surface is constructed modularly from at least three lighting modules comprising a first lighting module and further lighting modules, wherein the lighting modules interact with one another via corresponding interfaces so that the lighting modules can be easily and/or flexibly attached, removed, changed or otherwise grouped,
- wherein at least the first lighting module is triangular,
- wherein none of the lighting modules is rectangular,
- wherein the base surface of the first lighting module has a lateral edge b1 and a vertex E1 opposing this lateral edge b1, and
- wherein a connecting path between the vertex E1 and an intersection point L1 of a normal line with the lateral edge b1 is a height h1 of the first lighting module, where $0<h1\leq a$ and $b=b1$.

* * * * *